(No Model.)

F. B. RHODES.
CALIPERS.

No. 436,108. Patented Sept. 9, 1890.

WITNESSES:
Chas. H. Luther Jr
M. F. Bligh.

INVENTOR:
Franklin B. Rhodes,
by Joseph A. Miller & Co.,
Attys.

THE NORRIS PETERS CO., PHOTO-LITHO., WASHINGTON, D. C.

UNITED STATES PATENT OFFICE.

FRANKLIN B. RHODES, OF PROVIDENCE, RHODE ISLAND.

CALIPERS.

SPECIFICATION forming part of Letters Patent No. 436,108, dated September 9, 1890.

Application filed January 13, 1890. Serial No. 336,768. (No model.)

*To all whom it may concern:*

Be it known that I, FRANKLIN B. RHODES, of Providence, in the county of Providence and State of Rhode Island, have invented a new and useful Improvement in Calipers; and I hereby declare that the following is a full, clear, and exact description of the same, reference being had to the accompanying drawings, forming part of this specification.

This invention has reference to an improvement in calipers for taking internal, external, and linear measurements; and it consists in the peculiar and novel construction by which the legs of the calipers are operated and adjusted by a thumb-screw above the hinged ends of the legs, as will be more fully set forth hereinafter.

The object of this invention is to construct calipers so that the legs can be adjusted at the head of the calipers and held in the desired position so that the whole length of the legs may be inserted when taking the interior gage of a tube or cylinder; or the legs may extend over or around any article of which an outside gage is to be taken.

Calipers as heretofore constructed have a segmental arm connected with one of the legs and a clamp or adjusting-screw on the other leg. This arc or segmental arm limits the use of such calipers.

Figure 1:
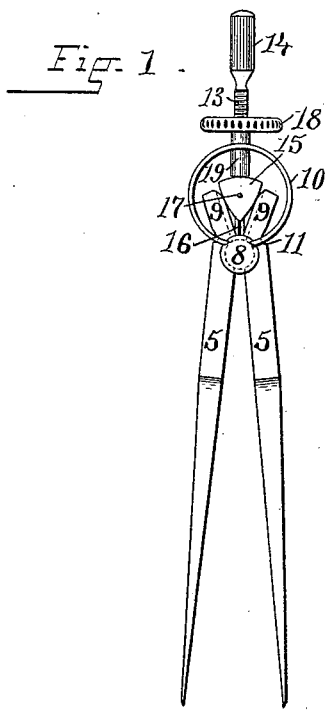
Figure 2:
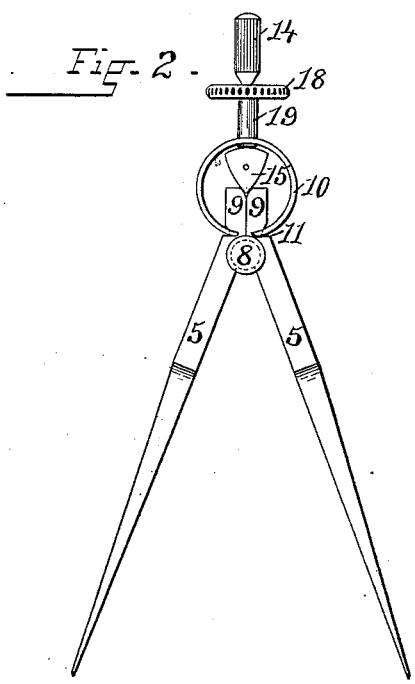
Figure 3:
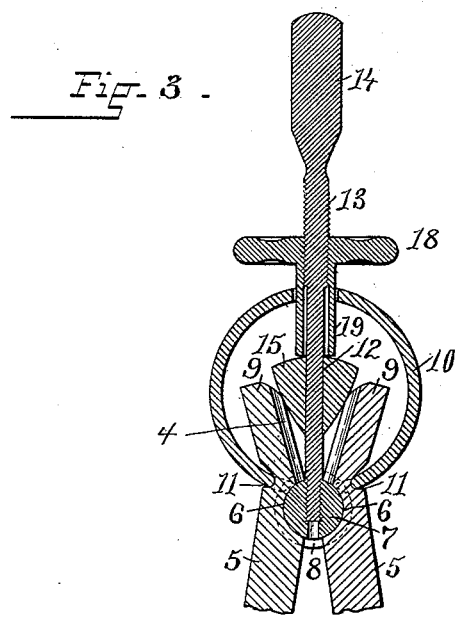

Figure 1 is a view of one of my improved calipers, showing the legs partly open. Fig. 2 is a view of the same, showing the legs open. Fig. 3 is an enlarged section of the head of the calipers.

Similar figures of reference indicate corresponding parts throughout.

5 indicates the legs of the calipers. In the drawings they are shown as straight and of the form usual in dividers used for drafting. These legs are made to curve outward for calipers for taking the interior caliber, and are made bow-shaped, with the free ends of the legs extending inward in calipers for taking the outer caliber, in the same manner and for the same purpose as these are now made for such calipers.

Each leg has the concaved bearing 6, formed near its upper end, fitting against the cylindrical pivot 7, having the disks 8 at the outer ends, which disks 8 are of greater diameter than the cylindrical pivot 7 and extend over the sides of the legs 5.

Each leg is provided with the extension 9, and the legs are held in contact with the cylindrical pivot 7 by the spring 10, the ends of which spring are slotted so as to extend over the sides of the legs, the central portion of the spring resting in the seat 11, formed in the legs at a point above the center of the cylindrical pivot 7.

The stem 12 is secured in the cylindrical pivot 7. The portion 13 of the stem is screw-threaded, and the upper end is provided with the enlarged handle 14. The wedge 15 slides on the stem 12.

To prevent the wedge 15 from turning, the stem 12 is provided with the longitudinal groove 16, into which the pin 17, secured in the wedge 15 enters. The extensions 9 of the legs are each provided with semicircular grooves 4 (shown in Fig. 3) on their inner sides to receive the stem 12 when the extensions are brought together and the legs are extended, as is shown in Fig. 2.

The thumb-piece or disk 18 is screw-threaded and provided with the sleeve 19, which bears on the wedge 15, so that by turning the thumb-piece 18 on the screw 13 in one direction the sleeve 19 pushes the wedge 15 between the extensions 9 of the legs 5 to separate the same, while if the thumb-piece is turned in the opposite direction the wedge is forced upward by the force of the spring 10 acting on the extensions 9 of the legs above the center of the cylindrical pivot 7.

To operate these calipers all that is required is to turn the thumb-piece 18 in one or the opposite direction. As this thumb-piece is above the pivotal connection of the legs, the legs may be inserted into any tube or other article their whole length and the calipers can be accurately adjusted in such position.

When the calipers are used for drafting, the advantages of accurately adjusting the legs by the thumb-screw are very great, and in dividing any distance into fractions the accuracy of the adjustment is of great value, particularly so from the fact that the thumb-piece can be conveniently used for turning the dividers from one leg to the other, which will be apparent to any draftsman if he will use these calipers as devices in laying out the risers for stairs in a sectional view of a building or any other similar division.

Having thus described my invention, I claim as new and desire to secure by Letters Patent—

1. The combination, in calipers and dividers, with the legs 5, provided with the concaved bearing-surface 6 and the extensions 9, of the cylindrical pivot 7, the stem 12, having the screw-threaded portion 13, the wedge 15, the thumb-piece 18, provided with the sleeve 19, and the spring 10, as described.

2. The combination, with the cylindrical pivot 7, provided with the disks 8, and the legs 5, having the concaved bearings 6, the extensions 9, and the seats 11, of the spring 10, the stem 12, secured in the cylindrical pivot 7, extending through a hole in the spring 10, screw-threaded at the upper portion and provided with the enlarged handle 14, the wedge 15, the sleeve 19, and the screw-threaded thumb-piece 18, constructed to adjust the calipers, as described.

FRANKLIN B. RHODES.

Witnesses:
WILLIAM M. SIMMONDS,
JOSEPH A. MILLER, Jr.